United States Patent Office 3,359,221
Patented Dec. 19, 1967

3,359,221
SULFUR-CURABLE MONOOLEFIN COPOLYMERS CONTAINING POLYUNSATURATED RUBBER
Melvin Albert Schoenbeck, Wilmington, Del., assignor to E. I. du Pont de Nemours and Company, Wilmington, Del., a corporation of Delaware
No Drawing. Filed Nov. 15, 1962, Ser. No. 238,003
10 Claims. (Cl. 260—5)

This invention relates to sulfur-curable, filler-loaded elastomeric compositions. More particularly, it relates to such compositions wherein the principal elastomer present therein is an α-olefin copolymer. Still more particularly, it relates to sulfur-cured, filler-loaded elastomers and methods for their preparation.

Sulfur-curable α-olefin hydrocarbon copolymers are acquiring increasing importance today in the manufacture of a wide variety of useful products. For some applications, such as shoe soles and heels, it is desirable that a large proportion of a reinforcing kaolin clay filler be present along with the α-olefin copolymer. Although such compositions can be cured by numerous sulfur-curing systems, the vulcanizates obtained require a higher modulus and lower compression sets for the contemplated uses. For other applications, such as vent window seals and molded corners on windshield gaskets, it is desirable that a large proportion of a reinforcing carbon black be used to extend the α-olefin copolymer; however, the compression sets at 100° C. of the vulcanizates obtained with the usual sulfur-curing systems have left something to be desired. It is known that improved results can be attained, to some extent, if these filled stocks are specially heat-treated prior to incorporation of the curing agent, and it has also been found that this heat-treatment is made more effective if certain promoters are present during the heat-treatment such as the dinitroso, dioxime, and aromatic quinoid compounds. It is, however, quite inconvenient and expensive to carry out the heat-treatment process. The extra time required to cool the heat-treated stocks before the curing agents can be added lowers the production rate.

It is, therefore, an object of the present invention to provide novel loaded hydrocarbon compositions displaying improved curability. It is a further object to provide novel sulfur-cured, filler-loaded α-olefin copolymer compositions and methods for their preparation. Another object is to provide such compositions which display improved modulus and a lower compression set. Yet another object is to provide such compositions by a process which obviates the need for an intervening heat treatment step. Other objects will appear hereinafter.

These and other objects are accomplished in accordance with this invention by a process for preparing a sulfur-cured, filler-loaded elastomeric composition which comprises mixing (I) a normally solid elastomeric copolymer of at least one α-monoolefin and at least one non-conjugated hydrocarbon diene, said elastomeric copolymer having up to about 2 gram-moles of carbon-to-carbon double bonds per kilogram, (II) from about 20 to 300 parts of a filler compound per 100 parts of copolymer, (III) up to about 10 parts, per 100 parts of copolymer, of a polyunsaturated rubber promoter composition having at least about 10 gram-moles of sulfur-reactable carbon-to-carbon double bonds per kilogram of promoter, and (IV) a sulfur-curing system in amounts containing sufficient sulfur to react with said copolymer and said promoter compound; and heating the mixture to effect a cure.

The principal elastomer is a normally solid elastomeric copolymer of at least one α-monoolefin and at least one non-conjugated hydrocarbon diene.

The α-monoolefins have the structure R—CH=CH$_2$, wherein R is H or C$_1$–C$_{16}$ alkyl. Representative examples of useful α-monoolefins include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene. The straight chain olefins are preferred.

Representative dienes include open-chain compounds of the formula

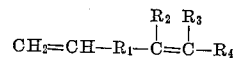

wherein R$_1$ is an alkylene radical, R$_2$ and R$_3$ are independently selected from the group consisting of hydrogen and alkyl radicals, and R$_4$ is an alkyl radical and wherein R$_1$ to R$_4$ are so selected that the diene has from about 6 to 22 carbon atoms. Examples of these dienes include: 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal non-conjugated carbon-to-carbon double bonds, e.g., 1,5-hexadiene and 1,4-pentadiene can be used but are less preferred. Representative cyclic non-conjugated dienes include: dicyclopentadiene; 5-alkenyl-substituted-2-norbornenes; 5-methylene-2-norbornene; 2-alkyl-2,5-norbornadienes.

Representative examples of copolymers made from these α-monoolefins and the above-described non-conjugated dienes and their preparation are described in U.S. Patents 2,933,480 and 3,000,866; in French Patents 1,285,090 and 1,302,690; and in assignee's U.S. application of Gladding and Nyce, Ser. No. 73,994, filed Dec. 6, 1960, now U.S. Patent 3,060,973. Particularly preferred are copolymers of from about 30 to 70 weight percent ethylene, 30 to 70 weight percent propylene and up to about 10 weight percent 1,4-hexadiene or dicyclopentadiene. As previously stated, these copolymers have up to about 2 gram-moles of carbon-to-carbon double bonds per kilogram.

These α-olefin copolymers can be oil extended before they are cured by the present invention. Copolymers having Mooney (ML–4/100° C.) viscosities of at least 50, preferably higher, and inherent viscosities of 1.8 or above (measured on a 0.1% solution by weight in tetrachloroethylene at 30° C.) have been found to be suitable. The oils used are petroleum oils having a flash point of at least about 300° F. and a viscosity-gravity constant in a range of from 0.80 to 1.0, preferably 0.80 to 0.90. The particularly preferred oils have a total nitrogen base and first acidaffin content of not greater than 15% by weight as determined by the Rostler method, described in Industrial and Engineering Chemistry, vol. 41, pages 598–608, March 1949. The viscosity-gravity constant is described in the 1958 booklet, "A Graphic Method for Selecting Oils Used in Compounding and Extending Butadiene-Styrene Rubbers" (Industrial Products Department, Sun Oil Company, Philadelphia, Pa., 1958). Representative oils include paraffinic oils, naphthenic, relatively aromatic, and aromatic oils. The petroleum oil can be introduced into the copolymer any time after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by empirical experimentation by those skilled in the art. A detailed view of the major petroleum oils is given in the article entitled, "Hydrocarbon Composition of Rubber Process Oils," by S. Kurtz, Jr., and C. C. Martin, India Rubber World Co., 126, No. 4, July 1952, page 495 onward.

A wide variety of fillers can be employed. Representative examples include: calcined kaolin clay, blanc fixe, titanium dioxide, magnesium silicate, esterified silica, kaolin clays, fine particle talc whiting, and carbon blacks. The filler compound used in the present invention is preferably a kaolin clay or carbon black.

Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate. It is not critical whether these kaolin clays are "residual" or "sedimentary" in origin; they can be produced by any conventional process such as the dry process (air flotation) or the wet process (classification in a water suspension). These clays are the clay minerals belonging to the kaolin group and have a stable non-expanding crystal lattice in which one gibbsite sheet is condensed with one silica sheet. Representative minerals include kaolinite, the most important one, nacrite, dickite, and halloysite. Kaolinite has the chemical formula

$$Al_2O_2 \cdot 2SiO_2 \cdot 2H_2O$$

It is to be understood that these kaolins generally also contain some compounds of iron, titanium, calcium, magnesium, potassium, sodium, and occasionally manganese; in kaolinites minor proportions of hydrated aluminum silicate minerals other than kaolinite may be present. In general, the molar ratio of silica to alumina in the clay is in the neighborhood of 2:1, the value of kaolinite itself.

The principal physical characteristics of a kaolin clay which are preferred for use in the present invention are: (1) a specific gravity of about 2.60; (2) a 325-mesh screen residue below about 3.5%, preferably below about 0.35%; (3) absorbed moisture content not above about 0 to 1%; (4) a particle size distribution wherein at least about 55% by weight of the particles are two microns or less in diameter; and (5) a pH (in water) of about 4.4 to 7.0, although specially prepared and treated clays may show pH values of 8.0 or higher.

Representatice "hard" and "soft" kaolines contain (by weight): 44 to 46% silica; 37.5 to 39.5% alumina; 0.5 to 2.0% iron oxide; and 1 to 2% titanium dioxide; the ignition loss of these representative clays is 13.9 to 14.0% by weight. Calcined kaolins can also be used, as mentioned above. Clays are more particularly described in the following publications: Compounding Ingredients for Rubber, third edition, 1961, Cuneo Press of New England, Cambridge, Mass., compiled by the Editors of Rubber World, 630 Third Ave., New York 17, N.Y.; Kaolin Clays and Their Industrial Uses, J. M. Huber Corp., New York, N.Y., second edition, 1955; India Rubber World, vol. 118, No. 6, New York, September 1948, pages 793–795; Clays, Their Occurrence, Properties and Uses, H. Ries, third edition, John Wiley & Sons, Inc., New York, 1927; The Chemistry and Physics of Clays and Other Ceramic Materials, A. B. Searle and R. W. Grimshaw, third edition, Interscience Publishers, Inc., New York, 1959; Preliminary Reports Reference Clay Materials, American Petroleum Institute Research Project 49, Columbia University, New York, January, 1951, and X-ray Identification and Crystal Structures of Clay Materials, edited by G. W. Brindley, London, 1951.

When carbon black is to be used channel and furnace process blacks are preferred. Stocks containing the former filler are slightly slower curing. Thus any of the channel blacks such as EPC, MPC, HPC, CC can be used. SAF furnace black is an excellent reinforcing agent; other furnace blacks such as SRF, HMF, CF, HAF, and FF can also be satisfactorily used. Thermal carbons can be employed but provide a lower order of reinforcement.

About 20 to 300 parts of filler are used per 100 parts of copolymer. When carbon black is used the amounts are frequently from 40 to 80 parts; when kaolin clay is the filler the amounts are frequently in the range of 80 to 120 parts.

The promoter is a polyunsaturated rubber composition having at least 10 gram-moles of carbon-to-carbon double bonds per kilogram. Preferred compositions are styrene-butadiene rubber, natural rubber, 1,4-polybutadiene, and 1,4-polyisoprene.

The preferred styrene-butadiene rubber contains about 96 to 57% butadiene monomer units and 4 to 43% styrene units by weight; it is sometimes referred to as "SBR." A particularly preferred copolymer, which incorporates about 23.5% styrene units by weight (corresponding to about 14.2 sulfur-curable C=C groups/kilograms) exhibits an intrinsic viscosity in toluene of about 2.09 which corresponds to a viscosity average molecular weight of about 270,000. The Mooney viscosity of raw uncompounded polymer read after 4 minutes operation of the large rotor at 100° C. ranges between about 46 to 54.

A wide variety of polybutadienes can be used in the present invention. The contain about 18.6 sulfur-curable C=C groups/kilogram. The polybutadiene preferred has 1,4-monomer units of which a major proportion are cis; in the particularly preferred polymer, at least about 90% of the 1,4-units are cis. These copolymers are more particularly described in U.S. Patents 2,979,488; 2,999,089, and 2,913,444; further processes for their preparation are given in German Patent 1,112,834. Polybutadiene containing a lower cis content and still suitable for use in the present invention is described in U.S. Patents 2,908,672 and 2,908,673. A wide variety of polyisoprenes can be used in the present invention. They contain about 14.7 sulfur-curable C=C groups/kilogram. The polyisoprene preferred is largely made up of 1,4-monomer units of which a high proportion (e.g., at least 90%) are cis. The preparation of these polymers is described more particularly in U.S. Patents 2,849,432, 2,856,391, 2,979,494, 2,908,672, 2,908,673, 2,913,444, and 2,977,349.

The proportion of the polyunsaturated rubber promoter to the elastomer should be selected so that there is at least about 0.05 gram-mole of sulfur-curable carbon-carbon double bonds in the promoter for every gram-mole of carbon-carbon double bonds in the elastomer. The number of sulfur-curable carbon-to-carbon double bonds can be less than the total number of carbon-to-carbon double bonds in the promoter. For example, the carbon-to-carbon double bonds in the styrene monomer units are not considered as sulfur cure sites. Otherwise vulcanizate properties tend to fall off, particularly the modulus and the compression set. The preferred ratios have values ranging from about 0.1 to about 1. Proportions giving a ratio above 1, e.g., 1.9, are usable but are not necessary and increase the sulfur requirement needlessly. In order to avoid adversely affecting the vulcanizate properties of the elastomer, it is desirable to avoid using too high a proportion by weight of the promoter compound. Those skilled in the art can determine the exact limit for each promoter compound employed by empirical experiments; however, in general, it is preferred to limit the weight to about 10% that of the elastomer. From about 2 to 3 parts of the preferred styrene-butadiene promoter having 76.5% butadiene by weight to 100 parts of principal elastomer is particularly preferred.

In operating the present invention, the cure promoter system is mixed with the principal elastomer stock at any time before curing begins. Although the order of addition is not important, it is essential that both the polyunsaturated compound and the sulfur for its carbon-to-carbon double bonds be present. The extra sulfur frequently amounts to about 30 to 50% of the weight of the promoter. Higher or lower proportions may be used. Those skilled in the art can determine by empirical experiments the optimum proportion of extra sulfur needed for a particular system. The following data will illustrate the procedure: an ethylene copolymer required 2.5 phr. sulfur in the absence of a promoter; when 3 parts of pale crepe were employed, 33% of 3 parts (1 part) of additional sulfur was supplied giving a total of 3.5 parts of sulfur. If this additional sulfur is missing, the polyunsaturated compound will consume sulfur needed for curing the elastomer itself and lead to an inferior vulcanizate. Mixing of the components of the curable composition is carried out in the conventional manner using rubber roll mills, Banbury mixers, and the like. In order to avoid premature scorch, it is preferred to mix at temperatures in the range 75 to 100° F., well below the cure temperature.

The compositions of the present invention can be very readily cured with sulfur to give outstanding vulcanizates. Any of the procedures familiar to those skilled in the processing of natural rubber, butadiene/styrene rubber and butyl rubber are suitable. It is preferable to use a combination of sulfur, a metal oxide, and a vulcanization accelerator. In general, about 0.2 to 3.5 parts of sulfur are used per 100 parts by weight of copolymer; it is to be understood that larger or smaller concentrations may be used when deemed desirable. Zinc oxide and cadmium oxide are the preferred oxides; zinc oxide is particularly preferred because it is more efficient, lower in cost, and is less hazardous to use. The concentration of the metal oxide is important since it, in conjunction with sulfur and accelerator, controls the ultimate state of cure. At concentrations of 3 to 10 parts by weight per 100 parts by weight of elastomer, the rate and state of cure are very satisfactory as indicated by modulus, compression set, and elongation. Concentrations above 10 parts are unnecessary. Concentrations below 3 parts are less satisfactory for developing and maintaining adequate vulcanizate properties. The most active accelerators include 2-mercapto-benzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercapto-benzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium monosulfide; tetramethyl thiuram disulfide; tellurium diethyldithiocarbamate; the zinc salt of dimethyl dithiocarbamic acid; 2-mercaptothiazoline; 2-mercaptothiazole; N,N - diethylthiocarbamyl-2-mercaptobenzothiazole; and 2,2'-dithiobis benzothiazole. Unlike natural rubber and styrene-butadiene rubber, the presence of a fatty acid is not necessary for the vulcanization of the α-olefin copolymers. In fact, their vulcanization is inhibited by the presence of relatively weak carboxylic acids if used in excessive amounts. At low concentrations (0.25 to 1.0 part by weight of copolymer), stearic acid is very useful as a release agent for heavily loaded stocks. Vulcanization is accomplished by heating the compounded stock (usually in a mold) at a temperature of about 266° F. (130° C.) to 356° F. (180° C.) for a period ranging from about 5 minutes to several hours; it is often preferred to cure the stock at 320° F. (160° C.) for about 20 to 30 minutes. Steam cures can be employed as well. Representative pressures can range from 60 to 225 lb./sq. in. steam and representative times can range from about 30 seconds to 30 minutes. The preferred steam cure is about 30 seconds at 225 lb./sq. in. steam pressure. The state of cure is best determined by extension modulus at 300% elongation.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, Davis and Blake, published by Reinhold Publishing Corp., New York, 1937, Chapter 6; Introduction to Rubber Technology, edited by M. Morton, Reinhold Publishing Corp., New York, 1959, pp. 93—129; The Applied Science of Rubber, edited by W. J. S. Naunton, Edward Arnold Ltd., London, 1961, pp. 346–413, 992–1099.

The invention will now be described in and by the following examples of certain preferred embodiments wherein parts and percentages are by weight unless otherwise specified.

*Example I*

A sulfur-curable ethylene hydrocarbon copolymer is prepared in accordance with the general directions described in U.S. Patent 2,933,480, consisting of the following monomer units by weight: 53.3% ethylene, 43.5% propylene, and 3.2% 1,4-hexadiene. The copolymer exhibits an inherent viscosity at 30° C. (0.1% by weight solution in tetrachloroethylene) of 2.94 and a Mooney (ML–4/100° C.) of 92.

A styrene-butadiene rubber promoter (identified hereinafter as SBR) is selected which consists of the following monomer units by weight: 76.5% butadiene and 23.5% styrene. It exhibits an intrinsic viscosity in toluene of about 2.09 corresponding to a viscosity average molecular weight of about 270,000, its transition temperature is about —62° C., its density at 25° C. is about 0.93 gram per cubic centimeter and the Mooney viscosity of the raw uncompounded copolymer right after 4 minutes operation of the larger rotor at 100° C. ranges between about 46 to 54.

The filler employed is an air-floated "hard" kaolin clay (commercially available from the J. M. Huber Corporation, New York, N.Y., as "Suprex" clay) containing 44 to 46% silica, 37.5 to 39.5% alumina, 1.5 to 2.0% iron oxide, and 1 to 2% titanium dioxide by weight, the ignition loss being 13.9 to 14.2% by weight. The maximum moisture content is 1% by weight and the pH (in water) is 4.5 to 5.5. This clay has a specific gravity of 2.60, a 325-mesh screen residue of 0.17% by weight and the following particle size distribution (by weight): greater than 10 microns, 0.1%; 5 to 10 microns, 2.8%; 4 to 5 microns, 1.5%; 3 to 4 microns, 2.3%; 2 to 3 microns, 3.4%; 1 to 2 microns, 9.0%; 0.5 to 1.0 micron, 19.0%; and 0 to 0.5 micron, 61.9%.

Two stocks are compounded on a rubber roll mill at a temperature between 75° F. and 100° F., containing parts of ingredients according to the following recipes:

| | Ia | Ib |
|---|---|---|
| Ethylene/propylene/1,4-hexadiene copolymer | 94 | 100 |
| Kaolin clay | 120 | 120 |
| Petroleum oil ("Necton 60")[1] | 20 | 20 |
| Stearic acid | 1 | 1 |
| SBR | 6 | 0 |

[1] Flash Point 445° F. Sum of N-bases and first acidaffins 1.5%; second acidaffins 28.3%; paraffins 70.2%; viscosity-gravity constant 0.834.

Stock Ib is a control containing no promoter composition. Both stocks are further compounded at 75 to 100° F. on a rubber roll mill according to the following general recipe:

| | Parts |
|---|---|
| Zinc oxide | 5 |
| Sulfur | 3.5 |
| Tetramethylthiuram monosulfide | 1.5 |
| 2-mercaptobenzothiazole | 0.5 |

The stocks thereby obtained are cured in a press for 20 minutes at 307° F. (152.8° C.). The following data are representative of those obtained on evaluation:

|  | Ia | Ib |
|---|---|---|
| 300% Modulus, lb./sq. in | 860 | 375 |
| Tensile strength, lb./sq. in | 1,200 | 1,875 |
| Compression set, percent | 26 | 52 |

From the above data it appears that the modulus can be more than doubled by employing styrene-butadiene rubber promoter.

Example II

Example I is substantially repeated except for the changes indicated herein. The α-olefin copolymer of Example I is replaced by one prepared in the same manner but having the following monomer units: 48.9% ethylene, 47.8% propylene, and 3.3% 1,4-hexadiene. The copolymer exhibits an inherent viscosity at 30° C. (0.1% by weight solution in tetrachloroethylene) of 2.52 and a Mooney (ML-4/100° C.) viscosity of 82 to 104.

Two stocks are compounded on a rubber roll mill at a temperature between 75 to 100° F. containing parts of ingredients according to the following recipes:

|  | IIa | IIb |
|---|---|---|
| Ethylene/propylene/1,4-hexadiene copolymer | 97 | 100 |
| Kaolin clay | 120 | 120 |
| Petroleum oil of Example I | 40 | 40 |
| SBR | 3 | 0 |

Both stocks were further compounded at 75 to 100° F. on a rubber roll mill according to the following recipe:

| | Parts |
|---|---|
| Zinc oxide | 5 |
| Sulfur | 3.5 |
| Zinc dimethyldithiocarbamate | 2.5 |
| 2-mercaptobenzothiazole | 0.5 |

The stocks thereby obtained are cured in a press at 320° F. (160° C.) for 30 minutes. The following representative data are obtained at 25° C.:

|  | IIa | IIb |
|---|---|---|
| 300% Modulus, lb./sq. in | 1,000 | 525 |
| Tensile strength, lb./sq. in | 1,550 | 1,400 |
| Elongation at break, percent | 540 | 680 |

The modulus of stock IIa prepared according to this invention is almost double that obtained in IIb when the promoter is omitted.

Example III

Example II is substantially repeated except for the changes indicated herein. A pale crepe natural rubber is substituted for the styrene-butadiene promoter and two stocks IIIa and IIIb (a control) are prepared having parts of ingredients according to the following recipe:

|  | IIIa | IIIb |
|---|---|---|
| Ethylene/propylene/1,4-hexadiene copolymer | 97 | 100 |
| Pale Crepe (natural rubber) | 3 | 0 |
| Kaolin Clay | 100 | 100 |
| TiO₂ Rutile | 35 | 35 |
| Petroleum Oil of Example I | 20 | 20 |
| Zinc Oxide | 5 | 5 |
| Sulfur | 3.5 | 2.5 |
| Zinc dimethyldithiocarbamate | 2.5 | 2.5 |
| 2-mercaptobenzothiazole | 1 | 0.5 |

Portions of each stock thereby obtained are cured at 320° F. for 10 and 30 minutes, respectively, in a press according to the data given in the following table. The resulting vulcanizates typically exhibit the following representative data at 25° C.:

|  | IIIa | IIIb |
|---|---|---|
| Press Cure, 10 minutes/320° F.: |  |  |
| 300% Modulus, lb./sq. in | 1,050 | 525 |
| Tensile Strength, lb./sq. in | 1,750 | 1,750 |
| Elongation at Break, percent | 580 | 750 |
| Press Cure, 30 minutes/320° F.: |  |  |
| 300% Modulus, lb./sq. in | 1,250 | 800 |
| Tensile Strength, lb./sq. in | 1,600 | 1,800 |
| Elongation at Break, percent | 420 | 600 |

Obviously, the modulus of stock IIIa prepared according to this invention is far higher than that of the control sample even at longer cure times.

Example IV

Example II is repeated except that the polyunsaturated rubber promoter is a commercial cis-1,4-polybutadiene having an inherent viscosity at 30° C. (0.1% by weight solution in tetrachloroethylene) of 2.48 and a Mooney viscosity (ML-4/100° C.) of 44.

Four stocks are compounded on a rubber roll mill at a temperature between 75 to 100° F. according to the following recipe:

|  | IVa | IVb | IVc | IVd |
|---|---|---|---|---|
| Ethylene/propylene/1,4-hexadiene copolymer | 99 | 98 | 97 | 95 |
| cis-1,4-polybutadiene | 1 | 2 | 3 | 5 |

When compounded as in Example II, the vulcanizates after 30 minutes press cure at 320° F. exhibit the following representative properties at 25° C.

|  | IVa | IVb | IVc | IVd |
|---|---|---|---|---|
| 300% Modulus, lb./sq. in | 1,325 | 1,425 | 1,400 | 1,100 |
| Tensile Strength, lb./sq. in | 1,875 | 1,800 | 1,675 | 1,275 |
| Elongation at Break, percent | 480 | 420 | 400 | 380 |

If, however, 10 parts or more of the promoter are used to only 90 parts of α-olefin copolymer, the modulus, tensile strength and elongation of vulcanizates drop to undesirably low levels.

Example V

Example IV is substantially repeated except for the changes noted herein. The α-olefin copolymer is prepared according to the general procedures described in U.S. Patent 2,033,480 and contains 56.8% ethylene monomer units, 40.0% propylene monomer units, and 3.2% 1,4-hexadiene monomer units. It exhibits an inherent viscosity at 30° C. (0.1% by weight solution in tetrachloroethylene) of 2.73 and a Mooney (ML-4/100° C.) viscosity of 80 to 90.

The cis-1,4-polybutadiene, the kaolin clay, the titanium dioxide, and the petroleum oil employed are the same as used in Example IV. In preparing the following four stocks, the recipes of Example IV are employed except that 3 parts of sulfur are used.

|  | Va | Vb | Vc | Vd |
|---|---|---|---|---|
| Ethylene/propylene/1,4-hexadiene copolymer | 99.75 | 99.5 | 99.0 | 100 |
| Cis-1,4-polybutadiene | 0.25 | 0.5 | 1.0 | 0 |

The vulcanizates obtained by curing these stocks in a press for 10 and 30 minutes at 320° F. display the following representative stress-strain properties at 25° C.:

|  | Va | Vb | Vc | Vd |
|---|---|---|---|---|
| Press Cure: 10'/320° F.: |  |  |  |  |
| 300% Modulus, p.s.i. | 700 | 825 | 950 | 500 |
| Tensile Strength, p.s.i. | 2,175 | 1,800 | 1,600 | 2,225 |
| Elongation at Break, percent | 740 | 640 | 580 | 720 |
| Press Cure: 30'/320° F.: |  |  |  |  |
| 300% Modulus, p.s.i. | 950 | 1,025 | 1,200 | 725 |
| Tensile Strength, p.s.i. | 1,775 | 1,750 | 1,750 | 2,200 |
| Elongation at Break, percent | 560 | 520 | 500 | 640 |

As can be seen, stocks Va–c have modulus values greatly increased over those of control Vd having no promoter present.

*Example VI*

The α-olefin copolymer selected is made in accordance with the general procedure disclosed in U.S. Patent 2,933,480 and consists of the following monomer units (by weight): ethylene, 56.5%; propylene, 40%; and 1,4-hexadiene, 3.5%. The Mooney viscosity (ML–4/100° C.) was 90.

Five stocks, each having the following composition, were prepared on a rubber roll mill at a temperature between 75 and 100° F.

Component: Parts by weight
Ethylene/propylene/1,4-hexadiene copolymer _ 100
Kaolin clay _____ 120
Petroleum oil _____ 40
Tetramethyl thiuram monosulfide _____ 2
2-mercaptobenzothiazole _____ 1

The SBR promoter of Example I is added as follows:

|  | VIa | VIb | VIc | VId | VIe |
|---|---|---|---|---|---|
| SBR (Parts) | 0 | 2 | 4 | 6 | 8 |
| SBR (moles C=C) | 0 | 0.028 | 0.057 | 0.085 | 0.134 |

To each stock sulphur is added in amounts ranging from 1 to 6 parts for 100. The following table illustrates typical molulus data (300% modulus in lb./in.$^2$ at 25° C.) for the vulcanizates cured for 20 minutes at 320° F.

| Sulfur (phr.) | VIa | VIb | VIc | VId | VIe |
|---|---|---|---|---|---|
| 1 | 400 | 500 | 200 | 140 | 100 |
| 2 | 540 | 950 | 800 | 600 | 480 |
| 3 | 580 | 1,120 | 1,070 | 880 | 800 |
| 4 | 600 | 1,220 | 1,200 | 1,080 | 1,020 |
| 5 |  | 1,300 | 1,280 | 1,240 | 1,200 |
| 6 |  | 1,320 | 1,300 | 1,350 | 1,350 |

A plot of the above modulus values will show that those of stock VIa containing no promoter (and, thus, outside the present invention) nearly level off after 2 phr. of sulfur are added so that over 4 phr. of sulfur effect practically no increase in modulus. However, the remaining stocks all within the instant invention show that modulus values can be obtained which are more than twice that obtainable without the SBR promoter.

*Example VII*

An α-olefin copolymer is prepared according to U.S. Patent 2,933480 containing about 50% ethylene, 45.5% propylene and 4.5% 1,4-hexadiene monomer units by weight. The copolymer exhibits a Mooney viscosity (ML–4/100° C.) of 94 to 105.

Three stocks, VIIa, VIIb and VIIc each having the following composition, are compounded on a rubber roll mill at a temperature between 75° F. and 100° F. according to the following general recipe:

Component: Parts by weight
Ethylene/propylene/1,4 - hexadiene copolymer _____ See table below.
HAF carbon black _____ 80.
Petroleum oil ("Necton 60") ____ 40.
SBR (of Example I) _____ See table below.
Zinc oxide _____ 5.
Zinc dimethyldithiocarbamate ___ 2.5.
2-mercaptobenzothiazole _____ See table below.
Sulfur _____ See table below.

These stocks are then cured for 10 minutes at 320° F. in a press. The following representative data are obtained at 25° C.:

| Sample | VIIa | VIIb | VIIc |
|---|---|---|---|
| Ethylene/propylene/1,4-hexadiene copolymer | 97 | 95 | 100 |
| SBR | 3 | 5 | 0 |
| 2-mercaptobenzothiazole | 1 | 1 | 0.5 |
| Sulfur | 3.5 | 3.5 | 2.5 |
| 300% Modulus, lb./sq. in | 1,600 | 1,700 | 1,400 |
| Tensile Strength, lb./sq. in | 2,650 | 2,450 | 2,900 |
| Elongation at Break, percent | 470 | 460 | 540 |

This example illustrates the increase in modulus obtainable using carbon black instead of kaolin clay over stocks containing no promoter.

*Example VIII*

Two stocks are prepared utilizing the α-olefin copolymer and the SBR promoter of Example I in the following recipe compounded at a temperature between 75° F. and 100° F.:

|  | VIIIa | VIIIb |
|---|---|---|
| Ethylene/propylene/1,4-hexadiene copolymer | 98 | 100 |
| HAF carbon black | 50 | 50 |
| Petroleum oil | 20 | 20 |
| Stearic acid | 1 | 1 |
| SBR | 2 | 0 |

Both stocks are then further compounded at 75 to 100° F. on a rubber roll mill with the following curing system:

Parts by weight
Zinc oxide _____ 5
Sulfur _____ 2
Tetramethylthiuram monosulfide _____ 1.5
2-mercaptobenzothiazole _____ 0.5

The stocks thus compounded are cured for 30 minutes in a press at 307° F. (152.9° C.). The following representative data are obtained at 25° C.:

|  | VIIIa | VIIIb |
|---|---|---|
| Tensile Strength, lb./sq. in | 3,050 | 2,600 |
| Elongation at Break, percent | 540 | 470 |
| Compression Set,[1] percent | 43 | 57 |

[1] Measured at 25° C. on Yerzley pellets after 22 hours compression at 100° C.

This example illustrates the improved compression set obtainable in stocks prepared according to this invention (VIIIa) over those (VIIIb) containing no promoter.

*Example IX*

A sulfur-curable ethylene hydrocarbon copolymer is prepared in accordance with the general directions described in U.S. Patent 2,933,480. This copolymer consists of the following monomer units by weight, 40–45% propylene; 3.5–4.5% 1,4-hexadiene; the remainder being ethylene. It has a Mooney viscosity (ML–4/100° C.) of 80–90.

Two stocks are compounded on a rubber roll mill at a temperature between 75 and 100° F. according to the following recipe (parts are by weight):

|  | IXa | IXb |
|---|---|---|
| Ethylene/propylene/1,4-hexadiene copolymer | 97 | 100 |
| SBR | 3 | 0 |
| Calcium carbonate filler | 75 | 75 |
| Zinc oxide | 5 | 5 |
| Sulfur | 3.5 | 2.5 |
| Zinc dimethyl dithiocarbamate | 2.5 | 2.5 |
| 2-mercaptobenzothiazole | 1 | 0.5 |

The resulting stocks are cured in a press for 10 and 30 minutes at 320° F. The following data are representative of those obtained on evaluation at 25° C.:

|  | IXa | IXb |
|---|---|---|
| Press Cure, 10 minutes/320° F.: |  |  |
| 300% Modulus, lb./sq. in | 650 | 450 |
| Tensile Strength, lb./sq. in | 1,550 | 1,200 |
| Elongation at Break, percent | 600 | 600 |
| Press Cure, 30 minutes/320° F.: |  |  |
| 300% Modulus, lb./sq. in | 800 | 650 |
| Tensile Strength, lb./sq. in | 1,100 | 750 |
| Elongation at Break, percent | 410 | 380 |
| Compression Set (22 hrs., 70° C.), percent | 15.2 | 20.8 |

This example illustrates that stock IXa prepared in accordance with the invention exhibits greatly increased modulus characteristics over control stock IXb containing no promoter. In this example the filler composition is calcium carbonate.

In the foregoing examples vulcanizate properties are measured in accordance with the following procedures:

Property:                             ASTM method
    Stress-strain                               D412–51T
    Compression set                      * D395–55

* Method B.

The carbon-to-carbon double bond content as used herein is determined as follows: Bromine is allowed to react with a weighed copolymer sample, a potassium iodide solution is added, and the excess bromine is determined by treating the liberated iodine with standard sodium thiosulfate. Potassium iodate is added, and the sample is again titrated to find the extent of substitution.

Twenty-five milliliters of a solution of 5 ml. bromine in one liter of $CCl_4$ is added to a solution of copolymer in 50 ml. of $CCl_4$ at 25° C. The flask is stoppered, covered wtih a few ml. of 25% aqeuous KI, and placed in the dark for two hours at 25° C. Then, the KI solution and about 25 ml. of additional 25% aqueous KI are introduced. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer. The total bromine $$\text{The total bromine moles/kg.} = \frac{(B-T)0.1}{2 \text{ (grams of copolymer)}}$$

where

B=ml. 0.1 N sodium thiosulfate used to first end point (before $KIO_3$ addition) of blank solution
T=ml. 0.1 N sodium thiosulfate used to first end point (before $KIO_3$ addition) of copolymer solution The bromine consumed by substituted moles/kg.=

$$\frac{[(M-H)]0.1}{\text{(Grams of Copolymer)}}$$

where

M=ml. 0.1 sodium thiosulfate added after $KIO_3$ solution introduced into copolymer solution
H=ml. 0.1 sodium thiosulfate added after $KIO_3$ solution introduced into blank solution A distinct advantage of the promoters of the present invention is that they obviate the necessity for carrying out the heat-treatment step when curing stocks containing a kaolin clay. Results are obtained which are comparable to those gained by the use of heat-treatment in combination with butyl rubber type heat treatment promoters. For example, a kaolin clay loaded ethylene/propylene/1,4-hexadiene copolymer containing about 3% SBR by weight when cured had a modulus equal to about 85% of that obtained by heat-treating the same kaolin clay loaded elastomer at 380° F. in the presence of 1 part of para-quinone dioxime and thereafter commencing the cure. In a similar fashion, the compression set of vulcanizates made from mixtures of this copolymer with carbon black are as good as those vulcanizates of this copolymer which have undergone a preliminary heat treatment of the black stock with para-quinone dioxime.

The α-olefin compositions of the present invention possess excellent ozone resistance and weatherability (that is, freedom from cracking and crazing) which makes them especially suitable for black stock applications such as hose, windshield blades and the like. The oil extended α-olefin compositions are characterized by exceptionally improved processing behavior which makes them very easy to calendar and extrude. The α-olefin compositions loaded with clay can be employed in the preparation of shoe soles and heels and a wide variety of molded articles. The uncured but compounded compositions are not affected by moisture and can be stored for lengthy periods before shaping and vulcanization.

What is claimed is:
1. A sulfur-curable, filler-loaded elastomeric composition comprising (I) a copolymer of ethylene, propylene and at least one non-conjugated diene or from about 5 to 22 carbon atoms, units of said diene constituting up to about 10 weight percent of said copolymer, (II) from about 20 to 300 parts, per 100 parts of copolymer, of a filler compound selected from the group consisting of carbon black and kaolin clay, (III) up to about 10 parts, per 100 parts of copolymer, of a polyunsaturated rubber promoter composition selected from the group consisting of styrene-butadeine rubber, natural rubber, cis-1,4-polybutadiene, and cis-polyisoprene, said promoter compositions having at least about 10 gram-moles of sulfur-reactable carbon-to-carbon double bonds per kilogram of said promoter with the mole ratio of total sulfur reactable carbon-to-carbon double bonds in said promoter to the carbon-to-carbon double bonds in said copolymer (I) being at least 0.05:1; and (IV) a sulfur-curing system in amounts containing sufficient sulfur to react with said copolymer and said promoter compound.

2. A composition as defined in claim 1 wherein (I) contains from about 30 to 70 weight percent ethylene units, about 30 to 70 weight percent propylene units and up to about 10 weight percent 1,4-hexadiene units.

3. A composition as defined in claim 1 wherein said filler compound is kaolin clay.

4. A composition as defined in claim 1 wherein said promoter composition is styrene-butadiene rubber.

5. A sulfur-cured, filler-loaded elastomeric vulcanizate comprising the following components subjected to curing conditions: (I) a copolymer of ethylene, propylene and at least one non-conjugated diene of from about 5 to 22 carbon atoms, units of said diene constituting about 10 weight percent of said copolymer, (II) from about 20 to 300 parts, per 100 parts of copolymer, of a filler compound selected from the group consisting of carbon black and kaolin clay, (III) up to about 10 parts, per 100 parts of copolymer, of a polyunsaturated rubber promoter composition selected from the group consisting of styrene-butadiene rubber, natural rubber, cis-1,4-polybutadiene, and cis-polyisoprene, said promoter compositions having at least about 10 gram-moles of sulfur-reactable carbon-carbon double bonds per kilogram of promoter with the mole ratio of total sulfur-reactable carbon-to-carbon double bonds in said promoter to the carbon-to-carbon double bonds in said copolymer of (I) being at least 0.05:1, and (IV) a sulfur-curing system in amounts containing sufficient sulfur to react with said copolymer and said promoter compound.

6. A vulcanizate as defined in claim 5 wherein (I) contains from about 30 to 70 weight percent ethylene units, about 30 to 70 weight percent propylene units and up to about 10 weight percent 1,4-hexadiene units.

7. A vulcanizate as defined in claim 5 wherein said filler compound is kaolin clay.

8. A vulcanizate as defined in claim 5 wherein said promoter composition is styrene-butadiene rubber.

9. A sulfur-curable, filler-loaded elastomeric composition comprising (I) a copolymer of ethylene, propylene and at least one non-conjugated diene of from about 5 to 22 carbon atoms, units of said diene constituting up to about 10 weight percent of said copolymer, (II) from about 20 to 300 parts, per 100 parts of copolymer, of a filler compound selected from the group consisting of carbon black and kaolin clay, (III) a polyunsaturated rubber promoter selected from styrene-butadiene rubber, natural rubber, cis-1,4-polybutadiene and cis-polyisoprene, said promoter having at least 10 gram-moles of sulfur-reactable carbon-to-carbon double bonds per kilogram of promoter, and said promoter being present in an amount to give from about 0.05 to 1.9 gram-moles of sulfur-curable carbon-to-carbon double bonds in said promoter per one gram-mole of sulfur-curable carbon-to-carbon double bonds in said copolymer, and (IV) a sulfur-curing system in amounts containing sufficient sulfur to react with said copolymer plus additional sulfur in an amount up to 50% by weight of said promoter.

10. A sulfur-cured, filler-loaded elastomeric vulcanizate comprising the following components subjected to curing conditions: (I) a copolymer of ethylene, propylene and at least one non-conjugated diene of from about 5 to 22 carbon atoms, units of said diene constituting about 10 weight percent of said copolymer, (II) from about 20 to 300 parts, per 100 parts of copolymer, of a filler compound selected from the group consisting of carbon black and kaolin clay, (III) a polyunsaturated rubber promoter selected from styrene-butadiene rubber, natural rubber, cis-1,4-polybutadiene and cis-polyisoprene, said promoter having at least 10 gram-moles of sulfur-reactable carbon-to-carbon double bonds per kilogram of promoter and said promoter being present in an amount to give from about 0.05 to 1.9 gram-moles of sulfur-curable carbon-to-carbon double bonds in said promoter per one gram-mole of sulfur-curable carbon-to-carbon double bonds in said copolymer; and (IV) a sulfur-curing system in amounts containing sufficient sulfur to react with said copolymer plus additional sulfur in an amount up to 50% by weight of said promoter.

References Cited

UNITED STATES PATENTS

| | | | |
|---|---|---|---|
| 2,933,480 | 4/1960 | Gresham et al. | 260—41 |
| 3,123,583 | 3/1964 | Howard et al. | 260—889 |
| 3,136,739 | 6/1964 | Adamek et al. | 260—889 |
| 3,179,718 | 4/1965 | Wei et al. | 260—889 |

OTHER REFERENCES

ECD–330, Development Products Report No. 18, E. I. du Pont de Nemours & Co. (Inc.) Wilmington, Del., December 1961.

JULIUS FROME, *Primary Examiner.*

MORRIS LIEBMAN, *Examiner.*

K. B. CLARK, J. H. DERRINGTON,
*Assistant Examiners.*